DIGITAL COMPUTER SYSTEM HAVING MULTI-LINE CONTROL UNIT

Filed March 27, 1967 4 Sheets-Sheet 1

DIGITAL COMPUTER SYSTEM HAVING MULTI-LINE CONTROL UNIT

Filed March 27, 1967 4 Sheets-Sheet 2

INVENTOR
JAMES RUSSELL BENNETT
BY
Christie, Parker & Hale
ATTORNEYS

DIGITAL COMPUTER SYSTEM HAVING MULTI-LINE CONTROL UNIT

DIGITAL COMPUTER SYSTEM HAVING MULTI-LINE CONTROL UNIT

Filed March 27, 1967 4 Sheets-Sheet 4

INVENTOR
JAMES RUSSELL BENNETT
BY
Christie, Parker & Hale
ATTORNEYS 3,514,758

DIGITAL COMPUTER SYSTEM HAVING MULTI-LINE CONTROL UNIT

James Russell Bennett, Glendora, Calif., assignor to Burroughs Corporation, Detroit, Mich., a corporation of Michigan Filed Mar. 27, 1967, Ser. No. 626,013
Int. Cl. G06f *3/00;* G08b *11/00*
U.S. Cl. 340—172.5 3 Claims

ABSTRACT OF THE DISCLOSURE

A digital computer system having a multi-line data communication control unit in which removable etched cards containing integrated circuitry thereon are utilized to provide circuitry for controlling the multi-line control unit. A first group of cards present circuitry which provides control signals to the multi-line control unit in response to identification signals presented to it by data communication line adapters. A second group of cards, each containing a particular group of control code characters, may be used to compare characters being transmitted with the group of characters on a particular one of the cards. Signals provided by the first group of cards in response to the identification signals are used to select the particular one of the second group of cards.

BACKGROUND OF THE INVENTION

This invention relates to digital computer systems having a multi-line control unit which governs communications over a single input-output channel between the computer and a plurality of input-output units and more particularly to such systems in which additional input-output units may easily be accommodated.

Computer systems in which the main memory of the computer is time-shared by one or more processing units and by a plurality of peripheral devices have become well known in recent years. In such systems, the central control unit allocates requests for accesses to the main memory made by processors and by the peripheral devices. By operating in such a manner, many processing and input-output operations may be executed simultaneously. Consequently, may users may operate the computer simultaneously, or apparently simultaneously, in such a way that each is, or may be, completely unaware of the use being made of the computer by others. Additionally, a number of programs may be executed such that none needs to be completed before another is started or continued. Where several independent processors are utilized in the system, each may have access to a common main memory of the system.

In systems of the type described in the preceding paragraph, the central control unit of the system allocates accesses to main memory which are requested by the various devices. A device having access to the memory during any given memory cycle need not, and probably will not, have access to the memory during the immediately succeeding memory cycle. Thus during successive memory cycles, the memory may be utilized in conjunction with entirely unrelated operations. The device which receives access to memory at any given time is determined on the basis of decisions made by the central control unit which thereby achieves optimum usage of the main memory and assures that all simultaneously preformed operations will be executed, insofar as possible, on a basis such that each of the operations is unaware that others are also being executed.

Transmission of data over long distances via commercially available transmission lines has long been known. Such transmission may occur, for example, over the Bell System telephone network, over the TWX network, the Telex network, or over leased lines. Recently, the transmission of data over such data communication lines has been made directly communicable with computer systems. Thus, a computer system may transmit data via data communication lines directly to, or receive data from, a terminal unit which may be several thousand miles away.

The various input-output units utilized in a computer system having a time-shared main memory ordinarily communicate with the central control unit of the system via a plurality of input-output controls units and a plurality of input-output channels. Each input-output unit will often have an individual control unit and an individual input-output channel associated with it. When a large number of data communication lines must communicate with the central control unit, it is often uneconomical to provide an individual control unit and input-output unit for each line. Since the transmission of data over the communication lines is relatively slow, it is possible to provide a single multi-line input-output control unit for all of the data communication lines. Data transmitted over all of the lines is thereby funnelled into a single input-output channel between the multi-line control unit and the central control unit.

Each data communication line is coupled to the multi-line control unit via a line adapter. The line adapters enable input-output units of different types to be connected to the same multi-line control unit. Among other functions, they provide a common interface between the input-output units and the multi-line control unit.

Control circuitry within the multi-line control unit must respond to signals provided by a line adapter which manifest characteristics of the particular type of input-output unit associated with that adapter. Thus, for example, the signals will designate whether the particular input-output unit transmits characters with the most significant bit first or the least significant bit first, the number of bits per character; whether horizontal parity is used; whether vertical parity is used; whether even or odd parity is used; whether transmission is synchronous or asynchronous; etc. Logic circuitry must be provided within the control unit which responds to these signals and causes the entire multi-line control unit to behave in a proper manner to control transmission of data between the computer and the input-output unit associated with the particular line adapter. When a customer desires to add a terminal unit of a new type to the system, it has heretofore been necessary to physically rewire the logic circuitry within the control unit in order that the logic circuitry respond properly to the control signals from the line adapter associated with the new input-output unit. Such rewiring is often inconvenient, expensive, and time consuming. Much "down time" often occurs as a result of the need to make such wiring changes.

An advantage of the present invention is that is enables new types of terminal units to be easily accommodated by the system.

Another advantage of the present invention is that it enables wiring changes within a multi-line control unit to be made simply by the addition or substitution of an etched circuit card within the unit.

The multi-line control unit must also be able to compare each transmitted character with a preselected set of control code characters. Control code characters are utilized to indicate various control information relative to the data being transmitted. Control code characters may be utilized, for example, to indicate the beginning of a message, the end of a message, the end of transmission or other information about the transmitted data. The particular control code format used by any given terminal unit is largely selected by the customer. The format is not necessarily dependent upon the type of terminal unit utilized. When a customer desires to add a terminal unit to the system which uses a control code format different from that used by other terminal units of the system, it has also heretofore been necessary to make inconvenient, time consuming and expensive wiring changes within the multi-line control unit.

Another advantage of the present invention is that it enables the system to accommodate easily new terminal units using control code formats different from those used by other terminal units of the system.

A further advantage of the present invention is that it provides an improved time-shared computer system in which a plurality of data communication lines communicate with the system via a multi-line input-output control unit and in which great flexibility is achieved with respect to the types of terminal units which may communicate with the system over these lines and with respect to the control code formats utilized by these terminal units.

SUMMARY OF THE INVENTION

In brief, the preceding and additional advantages are achieved in a system similar to that described in the copending patent application of J. R. Bennett and Roger E. Packard, Ser. No. 626,176, filed on even date herewith and assigned to the assignee of the present invention and which may be considered incorporated by reference herein. Removable etched cards containing integrated circuitry thereon are utilized to provide circuitry both for controlling the multi-line control unit and for matching transmitted characters against a preselected set of control code characters. A scanning means within the control unit sequentially scans the line adapters associated with the data communication lines and their respective terminal units. As each adapter is scanned, it presents signals on an adapter-identification bus which in turn are presented to a function matrix made up of a first plurality of etched cards. In response to the signals on the bus, the matrix presents signals on a particular combination of output function lines of the matrix. These function lines control the various functions of the multi-line control unit. Adapters associated with the same type terminal units may advantageously present the same signals on the adapter-identification bus thereby causing the same combination of function lines to have signals presented thereon. A new type terminal unit may easily be accommodated by adding an etched card which will cause the signals presented on the adapter-identification bus by the adapter associated with the new unit to energize a combination of the output function lines which will control the multi-line control unit properly for the new terminal unit.

Several of the output function lines from the matrix are used as inputs to a set of control code cards which are similar to the function matrix cards. As each adapter is scanned, signals on the several output function lines are used to select a particular one of the control code cards. Each control code card contains a particular combination of control code characters. The control code cards are utilized to recognize control code characters which are transmitted and, in response to such recognition, to provide output signals to function lines connected to the control code cards. Thus a character being transmitted is compared with the set of control code characters on the selected one of the control code cards and in response to a determination that the character is one of the set found on the card, signals are presented on a particular combination of function lines. These signals manifest information about the data which is being transmitted. Whenever a terminal unit using a new control code format is desired to be added to the system, the new code format may easily be accommodated simply by adding a new control code card which contains the control code characters of the new format.

BRIEF DESCRIPTION OF THE DRAWINGS

The manner of operation of the present invention and the manner in which it achieves the above and other advantages may be more clearly understood by reference to the following detailed description when considered with the drawings in which.

DETAILED DESCRIPTION

Figure 1:
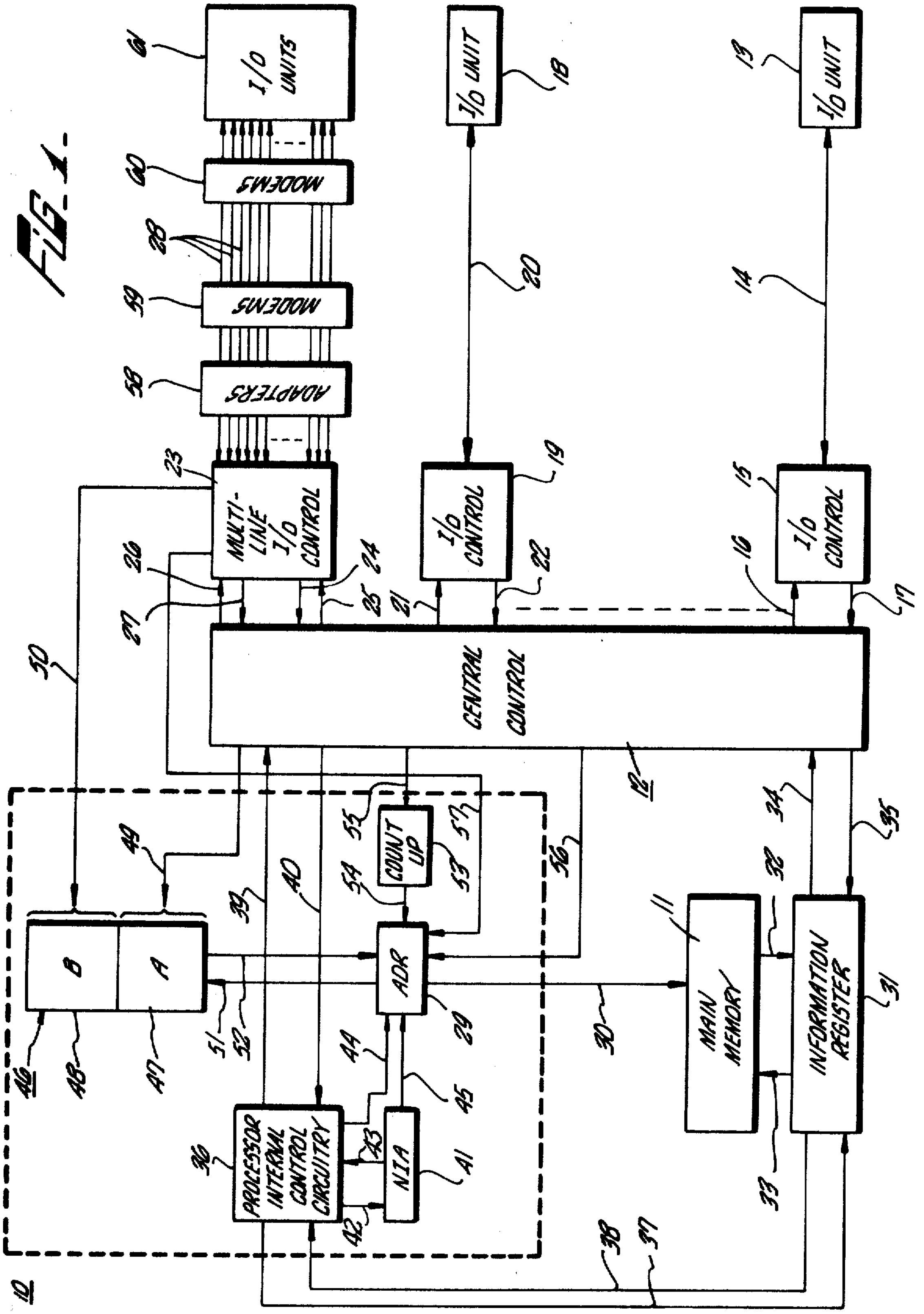
FIG. 1 depicts a block diagram of a computer system which incorporates the present invention.

FIG. 1 depicts a computer system of the type described in the aforesaid application of Bennett and Packard which may incorporate the present invention. It depicts central processing unit 10, main memory 11, and central control unit 12. Main memory 11 is time-shared by processor 10 and a plurality of input-output units. Access to memory 11 by the processor and the input-output units is controlled by the central control unit 12. Consequently, a plurality of input-output operations may proceed simultaneously, and many users may thereby utilize the system simultaneously in such a way that each can be completely unaware of the use of the system being made by others. Whenever the processor or any of the input-output units desire access to memory 11, they indicate this desire by transmitting a signal to central control unit 12. The central control unit 12 then handles these requests for memory access, and allocates memory accesses to the processor and the input-output units. Control unit 12 has a fixed number of input-output channels, each of which is reversed for a simple input-output control unit. The unit 12 may be considered, for purposes of description herein, to have twenty such input-output channels. Input-output unit 13 is connected to a first input-output channel of control unit 12 via line 14 and input-output control unit 15. The first input-output channel is indicated by lines 16 and 17. Although lines 16 and 17 are shown in FIG. 1 as single lines for the purpose of clarity, as are other lines depicted in the drawing, in actuality many lines will be utilized to transmit signals over the indicated paths. Input-output unit 18 is shown connected to the eighteenth input-output channel by input-output conrol unit 19 and lines 20, 21 and 22.

Some input-output units which must communicate with central control 12 are much slower than others with respect to their speed of operation. The allocation of a separate input-output channel to central control unit 12 for each such slow speed unit would be uneconomic. Transmission of data over data communication lines for example is relatively slow compared to the rate of transmission between a computer system and input-output units connected directly thereto. In FIG. 1 a multi-line input-output control unit 23 is utilized to connect a plurality of such data communication lines to central control unit 12 by means of only two input-output channels. These two input-output channels, the nineteenth and twentieth of control unit 12, are indicated by the lines 24 and 25 and by the lines 26 and 27, respectively.

For the purpose of description herein, the multi-line control unit 23 will be considered to be connected to thirty-six input-output units 61, shown as a single block for purposes of illustration, via data communication lines 28. The nineteenth input-output channel is utilized to transmit commands between control unit 12 and multi-line control unit 23, while the twentieth input-output channel is utilized to transmit data between these control units. Data transmitted between the computer system and the thirty-six input-output units connected to multi-line control unit 23 via the data communication lines 28 is thus funnelled to a single input-output channel connecting control units 23 and 12. As a result, the total number of input-output units which may be serviced by central control unit 12 has been increased from twenty to fifty-four.

Within the central processing unit 10 is address register 29. Address register 29 is utilized to address main memory 11 via line 30. Information is read from memory 11 to information register 31 via line 32, and is written into memory 11 from register 31 via line 33. Register 31 is connected to central control unit 12 via lines 34 and 35, and to control circuitry 36 within processor 10 via lines 37 and 38. Control circuitry 36 is connected to central control unit 12 via lines 39 and 40, to next instruction address register 41 within processor 10 by lines 42 and 43, and to address register 29 via line 44. Register 41 contains the address of the next instruction of a stored program being executed by processor 10. Register 41 is connected to address register 29 via line 45. Also within processor 10 is address memory 46. Address memory 46 comprises a section 47 and a section 48 which will hereafter sometimes be referred to as the A and B sections, respectively, of the address memory 46. Address memory 46 may advantageously be made up of a number of cards containing integrated transistor storage devices. Such cards are described, for example, in the copending application of Edwin S. Lee, III, Ser. No. 278,021, filed on May 6, 1963 now issued as Pat. No. 3,418,639 and assigned to the assignee of the present application. Although address memory 46 is made up of such integrated circuitry, it operates in the manner of a word-organized core memory.

Section A of address memory 46 is addressed via line 49 by central control unit 12 only. Section A of address memory 46 has two word locations reserved therein for each of the twenty input-output channels which connect control unit 12 to the input-output units and an additional two word locations reserved for use by the processor itself. Section B of address memory 46 is addressed via line 50 by the multi-line control unit 23 only. Section B has two word locations reserved therein for each of the thirty-six input-output units serviced by multi-line control unit 23. Address register 29 serves as an information register for address memory 46 as well as an address register for memory 11. Addresses for main memory 11 are written into address memory 46 from register 29 via line 51 and are read from memory 46 into register 29 by line 52.

When information is written into or read from memory 11 during any given memory cycle, the contents of address register 29 will ordinarily be counted up by circuitry 53 via line 54 prior to the next succeeding memory cycle. The counting up operation is under the control of central control unit 12 via line 55 connecting control unit 12 and count-up circuitry 53. For purposes of description herein memory 11 will be assumed to store individually addressable four-bit digits. It will further be assumed, however, that these digits will ordinarily be written into and read from memory 11 two digits at a time. Thus, during each memory cycle, count-up circuitry 53 will ordinarily increase the contents of address register 29 by two.

During the operation of the system shown in FIG. 1, input-output commands are transferred two digits at a time from main memory to the input-output control unit of the input-output unit to which they relate and to reserved locations within address memory 46. After such a command has been received in full, a channel descriptor word is controlled by the input-output control unit and is stored in memory 11 at a predetermined location therein, thereby designating that the complete command has been received. The address at which this descriptor word is to be stored is set into register 29 by central control unit 12 via line 56. When the input-output command relates to one of the input-output units associated with the multi-line control unit 23, the channel descriptor word stored in memory 11 and the nineteenth input-output channel indicates that the nineteenth channel is again free to receive an input-output command directed to a different one of the input-output units associated with multi-line control unit 23. When the particular input-output command has been executed by the multi-line control unit 23, a second descriptor word is stored in memory 11 from multi-line control unit 23 via line 57 connected between control unit 23 and address register 29. The freeing of the nineteenth input-output channel after an input-output command has been fully received, even though the command has not yet been executed, enables the nineteenth input-output channel to receive a second input-output command while the first is being executed by control unit 23. Similarly, additional input-output commands relating to other ones of the input-output units associated with control unit 23 may be received via the nineteenth input-output channel while several previously received commands are in the process of being executed by control unit 23. Thus, commands related to different ones of the input-output units associated with control unit 23 may be simultaneously executed by control unit 23.

With respect to the block diagram shown in FIG. 1, line adapters 58 are shown connected between multi-line input-output control unit 23 and the data communication lines 28. There will be a separate line adapter for each of the data communication lines, although for the sake of illustration they are shown in FIG. 1 as a single block. Additionally, two modulator-demodulators (hereinafter referred to as modems) 59 and 60 will be utilized in conjunction with each of the data communication lines. The modems also shown as single blocks, are stationed at opposite ends of each of the data communication lines. One modem modulates the digital data prior to its transmission over the data communication line, while the other modem demodulates the modulated signals received over the data communication line. Such modems are available, for example, through the American Telephone and Telegraph Company. Thus, with respect to each input-output unit 61 connected to multi-line input-output control unit 23, there will be a line adapter 58 adjacent the unit 23, a first modem 59 adjacent the line adapter 58, a second modem 60 adjacent the input-output unit, and data communication line joining the two modems. First modems 59 are shown adjacent the line adapter 58. The data communication lines 28 join these modems with second modems 60 which, in turn, are connected to input-output units 61. Although the system shown in FIG. 1 would have thirty-six separate line adapters 58, thirty-six separate modems 59, thirty-six separate modems 60, and thirty-six separate input-output units 61, each of these groups of components is shown as a single block on FIG. 1 for the purposes of illustration.

The line adapters 58 enable input-output units of different type to be connected to the same input-output control unit. These line adaptors provide a common interface between each of the input-output units 61 and the multi-line control unit 23. Additionally, they change the electrical and logical levels of signals provided by the modems 59 and transform these signals into signals which are compatible with multi-line control unit 23. They also provide a timing function whereby they accommodate different clock rates required by the input-output units to the multi-line control unit 23. Furthermore, they provide bit handling circuitry and control circuitry whereby a bit may be temporarily stored and, additionally, provide logic circuitry for controlling the modems 59. Line adapters of this type are well-known and have been designed to operate with various different types of input-output units. See Pat. No. 3,390,379.

During the operation of the system depicted in FIG. 1, the central control unit 12 allocates accesses to main memory 11 requested by the processor, by the eighteen input-output units associated with the first eighteen input-output channels, and by the thirty-six input-output units associated with the nineteenth and twentieth input-output channels via multi-line control unit 23. All of these fifty-five devices may be operating simultaneously such that each is virtually unaware of the fact that memory 11 is also being addressed by the other devices. Thus, while only one of the devices will have access to memory 11 during any given memory cycle, any of the other devices may be allocated access to the memory during the immediately succeeding memory cycle. It is the central control unit 12 which determines which of the devices has access to memory 11 during any given memory cycle. Assume, for example, that the processor wishes to execute the next command in a program which it is in the midst of executing. The address of this next command is stored in next instruction address register 41. This address is transferred to address register 29 via line 45. During a first memory cycle granted to the processor the first two digits of the command are read out of memory 11 into information register 31 and thence transferred via line 38 to processor control circuitry 36. At the end of this memory cycle the contents of register 29 are counted up by two by the counting circuitry 53 and the new contents of address register 29 are stored in the first of the two word locations in section A of address memory 46 which are reserved for the processor. By having granted memory access to the processor during the memory cycle just discussed, the central control unit 12 automatically addressed the word location in address memory 46 reserved for the processor. Thus, at the end of the memory cycle granted to the processor, the address of the next section of the command which the processor desires to execute has been stored in that location in section A of address memory 46 which is reserved for the processor. When the processor is next granted access to memory 11, the address of the next section of the processor command is read from section A of address memory 46 into address register 29. The remainder of the command is fetched by the processor in a similar manner and the processor then commences to execute the command.

The read out of a data word proceeds in a manner identical to the read out of an instruction word. Processor requests for memory access may be transmitted to central control 12 via line 39, while grants of access to the processor may be transmitted to processor control circuitry 36 via line 40.

Requests for memory access by the input-output units proceed in a manner similar to that described for the processor. Thus, for example, if input-output unit 13 requests a memory access this request will be transmitted via input-output control unit 15 and line 17 of the first input-output channel to central control unit 12. When memory access is granted to this input-output unit by central control unit 12, the central control unit 12 automatically addresses that location of section A of address memory 46 which is reserved for the first input-output channel. Consequently, when input-output control unit 15 is in the midst of transferring data between input-output unit 13 and memory 11, this data will be transferred via register 31 and lines 34 and 35 into or from the addresses in memory 11 specified by the contents of a word location in section A of memory 46 reserved for the first input-output channel. Time-sharing of a computer main memory 11 between a processor and input-output units such as units 13 and 18 by means of central control unit 12 and input-output control units 15 and 19 is well known and will not be described at length herein.

The extension of such time-sharing to input-output units controlled by a single multi-line control unit has heretofore presented certain difficulties which, as described in the application of Bennett and Packard referred to hereinbefore are eliminated by the use of section B of address memory 46. Section B of address memory 46 is not addressed by central control unit 12 as is section A, but, rather, is addressed solely by the multi-line control unit 23 itself. Section A of address memory 46 has only two word locations reserved therein for the twentieth input-output channel. The twentieth input-output channel, however, receives data from and transmits data to thirty-six different input-output units. Without the use of section B of address memory 46 there would be only one area in memory 11 wherein data received from all thirty-six input-output units would be stored. Data from these thirty-six units would then be completely intermixed within this memory area.

The B section 48 of the address memory 46, however, is reserved exclusively for the data communication lines. This section 48 is addressed solely by multi-line input-output control 23 via line 50. When a particular one of the input-output units 61 desires access to memory 11, this request is transmitted via the multi-line input-output control 23 and the twentieth input-output channel to the central control unit 12. When memory access for this request is granted by control unit 12, the data character is transferred between the particular one of the input-output units 61 and a predetermined address in main memory 11 reserved for this particular one of the input-output units 61 via information register 31. The predetermined address within memory 11 is selected by means of an address word stored in a location within section B of address memory 46 which is reserved for the particular one of the input-output units 61 which has requested access. This reserved location within section B of address memory 46 is itself addressed by means of line 50 from multi-line input-output control 23. For example, if the thirtieth one of the input-output units 61 is in the process of transmitting information characters to particular locations in memory 11, and a character from this thirtieth input-output unit is received by multi-line control 23, central control unit 12 will be requested to grant an access to memory 11. When this request is granted, multi-line control unit 23 will address, via line 50, a word in section B of address memory 46 which is reserved for the thirtieth unit 61 and this word will be read out into address register 29. The character received from the thirtieth input-output unit will be transmitted via the twentieth input-output channel and information register 31 into the address in memory 11 specified by the word now stored in address register 29. The contents of address register 29 will then be counted up by two by circuitry 53 and will be returned to the location in section B of address memory 46 which is reserved for the thirtieth input-output unit 61. Subsequently, many of the other devices which can obtain access to memory 11 may be granted access by control unit 12 to the memory. When the next data character is received from the thirtieth input-output unit 61, however, another request for memory access will be made and, when granted, this character will be stored in the address in memory 11 now specified in the location in section B of address memory 46 which is reserved for the thirtieth input-output unit 61. As a result, successive characters received from the thirtieth input-output unit 61 will be stored in adjacent locations within memory 11, despite the fact that many other characters from other ones of the input-output units 61 may have been received intermediate the two characters from the thirtieth input-output unit 61.

Figure 2:
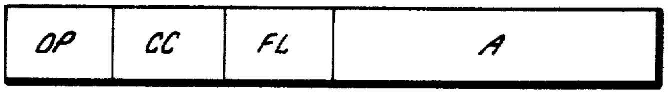
FIGS. 2 and 3 depict illustrative commands which may be executed by the system shown in FIG. 1.
Figure 3:
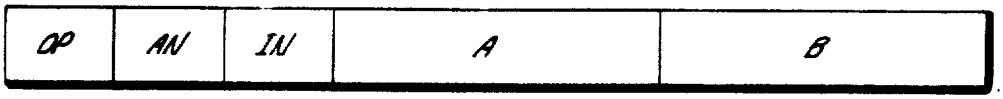
Figure 4:
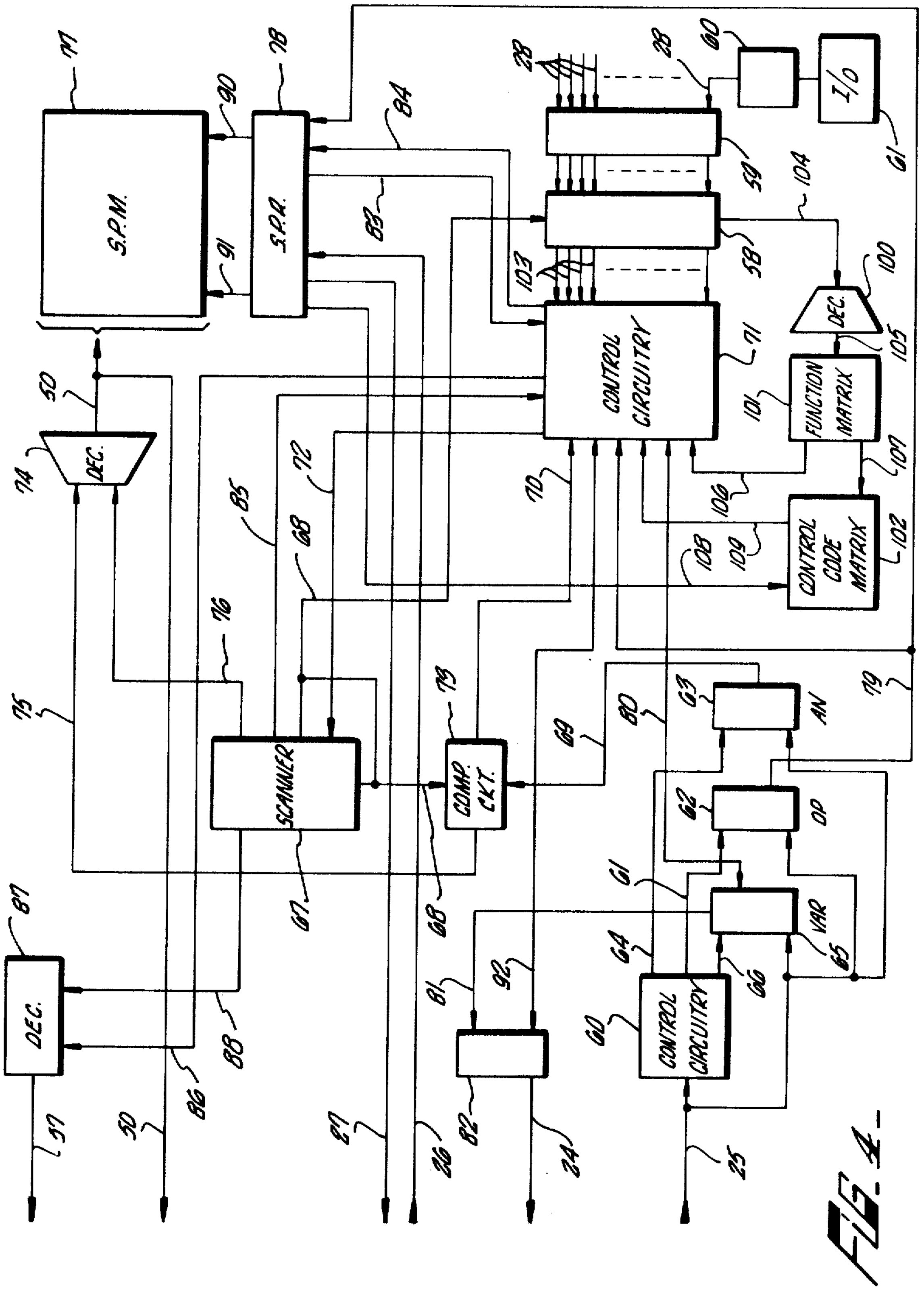
FIG. 4 depicts in greater detail the multi-line input-output control unit shown in FIG. 1.

FIGS. 2 and 3 depict exemplary commands which may be utilized in the computer system of FIG. 1 and FIG. 4 depicts in greater detail the multi-line control unit 23 of FIG. 1. Elements common to both FIG. 1 and FIG. 4 bear the same reference characters in both figures. A particular input-output command executed by multi-line control unit 23 will now be described.

FIG. 2 depicts an "initiate input-output" command which is part of a program being executed by processor 10. The command shown in FIG. 2 is made up of two syllables, each of which comprises six digits. The first two digits, designated OP, indicate that an input-output command is to be performed. The next two digits, designated CC, indicate the particular input-output channel which is to be utilized. It will be assumed that these digits indicate that the twentieth input-output channel, which is associated with multi-line control unit 23, is to be utilized. The next two digits, designated FL, indicate the field length of the input-output command which is to be executed. It will be assumed that the field length indicated is three syllables. The second syllable of the "initiate input-output" command shown in FIG. 2 indicates the address of the input-output command which is subsequently to be executed.

Initially, the next instruction address register 41 will contain the address of the first digit of the OP digits shown in FIG. 2. This address will be transferred from next instruction address register 41 to address register 29. When a processor memory access is granted by central control unit 12, the two OP digits will be read out of memory 11 and stored in processor control circuitry 36. The address stored in register 29 will then be increased by two and stored into the location in section A of address memory 46 reserved for the processor. When a processor memory access is again granted, this address will be read out of the address memory and the CC digits of the command shown in FIG. 2 will be read out of memory 11 and transferred to processor control circuitry 36. Subsequently, the contents of address register 29 will again be increased by two and returned, under the control of central control unit 12, to the location in section A of address memory 46 which is reserved for the processor. In like manner, the two FL digits will be read from memory 11 and transferred to processor control circuitry 36 and, also in like manner, the six digits making up the A address of the command shown in FIG. 2 will be read out of memory 11 two digits at a time and transferred to processor control circuitry 36. At this time the "initiate input-output" command shown in FIG. 2 has been fully read out of memory 11 and stored in control circuitry 36.

Circuitry 36 then indicates to central control unit 12 via line 39 that an input-output command is to be performed and that the twentieth input-output channel is to be utilized. When the next processor memory access is granted, the word in the location in section A of memory 46 reserved for the processor is read into address register 29, address register 29 is cleared, and the A address of the command shown in FIG. 2 which is stored in control circuitry 36 is inserted into the address register 29 via line 44. Thus, at this time address register 29 contains the address of the input-output command depicted in FIG. 3. This new address is then restored into the location in section A of address memory 46 which is reserved for the processor.

In the operation just described, processor 10 has fetched and executed the "initiate input-output" command depicted in FIG. 2. During the fetch of this command it transferred the command from memory 11 to processor control circuitry 36. During the execution of the command it transferred to central control unit 12 via line 39 the two CC digits of the command which designate the particular input-output channel to be utilized during a succeeding input-output command. Additionally, it inserted the address A of the command shown in FIG. 2, which is the address of the input-output command depicted in FIG. 3, into the location in section A of address memory 46 which is reserved for the processor. During succeeding memory cycles which are allocated to the processor it will fetch the input-output command depicted in FIG. 3. During the first memory cycle of this fetch operation, the two OP digits are fetched from memory 11, transmitted via register 31 and line 34 to the central control unit 12, and thence transmitted via line 25 of the nineteenth input-output channel to the multi-line control unit 23. FIG. 4 depicts a portion of the multi-line control unit 23. The two OP digits received by control unit 23 over line 25 are directed by control circuitry 60 and line 61 to register 62. During a succeeding memory cycle allocated to the processor, the next two digits of the command depicted in FIG. 3, the AN digits, are transmitted to multi-line control unit 23 and directed by control circuitry 60 and line 64 to register 63. Similarly, during the next memory cycle allocated to the processor, the next two digits, the IN digits of the command shown in FIG. 3 will be transmitted to multi-line control unit 23 and directed to register 65 by control circuitry 60 and line 66.

At this time the processor has transferred the first syllable of the command shown in FIG. 3 to the multi-line control unit 23. During the next six memory cycles which are allocated to the processor, the A and B addresses of the command shown in FIG. 3 are transferred from memory 11 to processor control circuitry 36. Processor control circuitry 36 then notifies central control unit 12 via a signal transmitted on line 39 that the fetch of the command depicted in FIG. 3 has been completed.

Next, the A and B addresses of the command in FIG. 3 are transferred via line 44 to address register 29 and subsequently stored in the two word locations in section A of address memory 46 which are reserved for the multi-line control unit 23. At this time execution of the command depicted in FIG. 3 is turned over to multi-line control unit 23 and the processor is free to perform other functions. For purposes of description it will be assumed that the OP digits of the input-output command of FIG. 3 indicate that the operation to be performed is an "input" operation whereby data transmitted by a particular one of the input-output units 61 are to be written into memory 11. It will further be assumed that the AN digits of the command specify that the data is to be transmitted by the first one of the input-output units 61. The two digits of the command designated as the IN digits constitute variant digits which under certain circumstances may effect changes in either the OP or AN digits. For the purposes of the present discussion the IN digits will not be utilized. The A address depicted in FIG. 3 represents an address in memory 11 where storage of data to be received from the first input-output unit 61 is to be commenced. The B address of the command depicted in FIG. 3 may represent the final address of the section of memory 11 allocated to the first input-output unit 61 and beyond which data received from this input-output unit may not be stored.

Scanner 67 depicted in FIG. 4 sequentially presents signals on thirty-six output lines 68, shown as a single line for purposes of illustrative clarity, which are associated with the thirty-six line adapters 58. Compare circuit 73 is connected to scanner 67 by the lines 68 and is connected to register 63 by line 69. After execution of the command of FIG. 3 has been turned over to the multi-line control unit 23, scanner 67 sequentially scans the thirty-six line adapters until it scans that adapter which is identified by the contents of register 63. At this time compare circuitry 73 recognizes that the scanner 67 is pointing at the adapter identified by the contents of register 63. When this comparison is made, a signal on line 70 from compare circuit 73 notifies control circuitry 71 that there has been a comparison and control circuitry 71, via line 72, in turn causes the scanner 67 to stop at this position.

At this time signals from compare circuit 73 and scanner 67 are applied to decoder 74 via lines 75 and 76, respectively. Decoder 74 decodes the signals on line 76 into a signal on one of thirty-six output lines 50. These lines 50 are used to address thirty-six word locations contained in scratchpad memory 77 and to address the word locations reserved in section B of address memory 46 for the thirty-six input-output units 61. Scratchpad memory 77 may advantageously be identical in structure to address memory 46. The word locations in scratchpad memory 77 are related respectively to ones of the thirty-six line adapters 58.

The comparison detected by circuitry 73 causes the contents of register 62, the OP digits, to be transferred via line 79 to control circuitry 71 and to scratchpad register 78 and also causes the A and B addresses of the command shown in FIG. 3 to be transferred from Section A to the two word locations in section "B" of address memory 46 which are reserved for the first one of the input-output units 61. Since at any given instant in time the multi-line control unit 23 is acting upon data transmitted via only one of the line adapters 58, there need be only one "hard" storage register which is shared by all of the adapters. If, for example, a word length of forty bits of temporary storage is required for each of the thirty-six data communication lines, the scratchpad memory 77 will have a capacity of 1,440 bits while the register 78 will provide "hard" storage for forty bits. In this manner the prohibitive expense of providing 1,440 bits of "hard" storage is avoided. The scratchpad memory 77 has a word location reserved therein for each of the data communication lines. As scanner 67 stops at a particular line adapter, the word in memory 77 reserved for the particular line is read into register 78 via line 90 and written back into memory 77 via line 91 when scanner 67 resumes scanning.

Upon the reception of the OP digits into register 78, control circuitry 71 inserts a channel descriptor word in register 65 via line 80, and subsequently causes this word to be transmitted to central control unit 12 via line 24 by means of line 81 and control circuitry 82 in response to a signal applied to line 92 by control circuitry 71. Upon receiving the channel descriptor word from multi-line control unit 23 over line 24, the central control unit 12 inserts into address register 29, via line 56, an address in memory 11 reserved for channel descriptor words from multi-line control unit 23. Central control unit 12 then transmits the descriptor word received over line 24 into this address memory 11 via line 35 and register 31. Reception of this channel descriptor word indicates that the command depicted in FIG. 3 has been received by the register 78, and that the nineteenth input-output channel is free to receive input-output commands directed to ones of the input-output units 61 associated with multi-line control 23 other than the first input-output unit 61.

At this the command depicted in FIG. 3 has been accepted by register 78 and multi-line control unit 23 proceeds to execute the command. Lines 83 and 84 connect register 78 to control circuitry 71, and line 85 connects scanner 67 to control circuitry 71. In response to signals from scanner 67 and register 78, control circuitry 71 transmits a signal to the first one of the input-output units 61 via the line adapter 58, modem 59, data communication line 28, and modem 60 associated with this input-output unit which indicates to the selected input-output unit that it is to commence transmitting information to the system. Subsequently, the selected input-output unit 61 commences to transmit the requested data. This data is transmitted bit by bit via its data communication line to control circuitry 71 and stored in the word location in scratchpad memory 77 which is reserved for this particular input-output unit 61. When a complete character of bits has been received from the first input-output unit 61 and is in register 78, control circuitry 71 recognizes that a complete character has been received and causes the character to be transmitted via line 27 to central control unit 12. The signal on line 50 from decoder 74 is now utilized to address that location in section B of address memory 46 which is reserved for the first input-output unit 61. The A address of the command depicted in FIG. 3 which is stored in that location is then written into register 29. Consequently, when central control unit 12 allocates a memory access to the multi-line control unit 23, the character just received from the first input-output unit 61 is stored into main memory 11 at the address designated by the A address of the command depicted in FIG. 3. Subsequent to this storage in memory 11, the address in register 29 is increased by two and returned to the location in section B of address memory 46 reserved for the first input-output unit 61. Subsequently received bits from the first input-output unit 61 are similarly stored in scratchpad memory 77 until a complete character is assembled in register 78 and then are transmitted via line 27 of the twentieth input-output channel to an address in memory 11 designated by an address word stored in the location in address memory 46 reserved for this input-output unit. When the final character of the data transmitted by input-output unit 61 has been received, control circuitry 71, in a manner described hereinafter, recognizes that the transmission is complete and presents a signal via line 86 to descriptor address decoder 87. Line 88 connects scanner 67 with decoder 87. Decoder 87 is now utilized to insert an address in address register 29 via line 57, which address is reserved for result descriptor words associated with the first one of the input-output units 61. Control circuitry 71 then inserts such a descriptor word in register 78 and causes it then to be transmitted via line 27 to control unit 12. It then is stored in memory 11 at the address designated by the signals transmitted over line 57. This result descriptor word indicates that transmission from the first input-output unit 61 is complete, and that the command depicted in FIG. 3 has been fully executed.

The control circuit 71 in combination with each of the adapters 58 operates to transfer data between the registers 78 and each of the remote input-output units. In Pat. 3,390,379, there is described many of the details of a system for accomplishing this transfer although much of the function of the control circuit 71 is included within the adapters described in the patent. However, the principles necessary to the design of the control circuitry required in the control circuit 71 and the adapters 58 is well known and can be readily implemented from the teaching of the patent.

As blocks of data are transferred between the input-output units 61 and the multi-line control unit 23, it is essential that control circuitry 71 be able to determine the type of input-output unit which is sending or receiving data at any given time. This is accomplished in the present invention by means of a decoder 100 and parameter function matrix 101 shown in FIG. 4. Additionally, it is essential that control circuitry 71 be able to recognize control code characters as they are being transferred between control unit 23 and input-output units 61. The input-output units 61 may utilize a number of different control code formats and control circuitry 71 must therefore be aware of the particular format utilized by the particular input-output unit 61 which is sending or receiving data at any given time. Control code matrix 102 shown in FIG. 4 is utilized to indicate to control circuitry 71 both the particular control code format being used by a given one of the input-output units 61 and whether or not a given character being transmitted or received by that input-output unit is a control code character. Both the function matrix 101 and control code matrix 102 are made up of removable cards which contain integrated circuitry thereon. Since these cards are removable, the matrices 101 and 102, and hence the entire system, may easily be adapted to accommodate a number of different types of input-output units 61 and also a number of different control code formats.

Data is transmitted between the line adapters 58 and the input-output control unit 23 via an adapter bus indicated in FIG. 4 by the lines 103 and 104. The connection of the adapter bus to a particular one of the thirty-six line adapters 58 is controlled by signals from scanner 67 appearing on line 68. Several lines of the adapter bus which are depicted in FIG. 4 by the single line 104, for purposes of illustration, are designated the adapter information bus and are connected to decoder 100. If, for example, there are five lines in the adapter information bus 104, signals on these five lines may be decoded into signals on one of thirty-two output lines 105 of decoder 100. A signal on one of these lines 105 is utilized by the function matrix 101 to present signals on particular ones of a number of function control lines 106 which are utilized to indicate to control circuitry 71 the nature of the selected one of the input-output units 61. Additionally, function control lines 107 from control matrix 101 are transmitted to control code matrix 102. Control code matrix 102 utilizes these signals on function control lines 107 to select a particular control code card within matrix 102. A character being transmitted between control unit 23 and the selected input-output units 61 and temporarily stored in register 78 is compared via line 108 with a set of control code characters manifested on the selected one of the control code cards. If a comparison is made, indicating that the character being compared is a control code character, a signal is presented to control circuitry 71 via lines 109. The operation of the adapter information bus decoder 100, function matrix 101 and control code matrix 102 will now be more fully described in connection with a discussion of FIGS. 5, 6 and 7.

Figure 5:
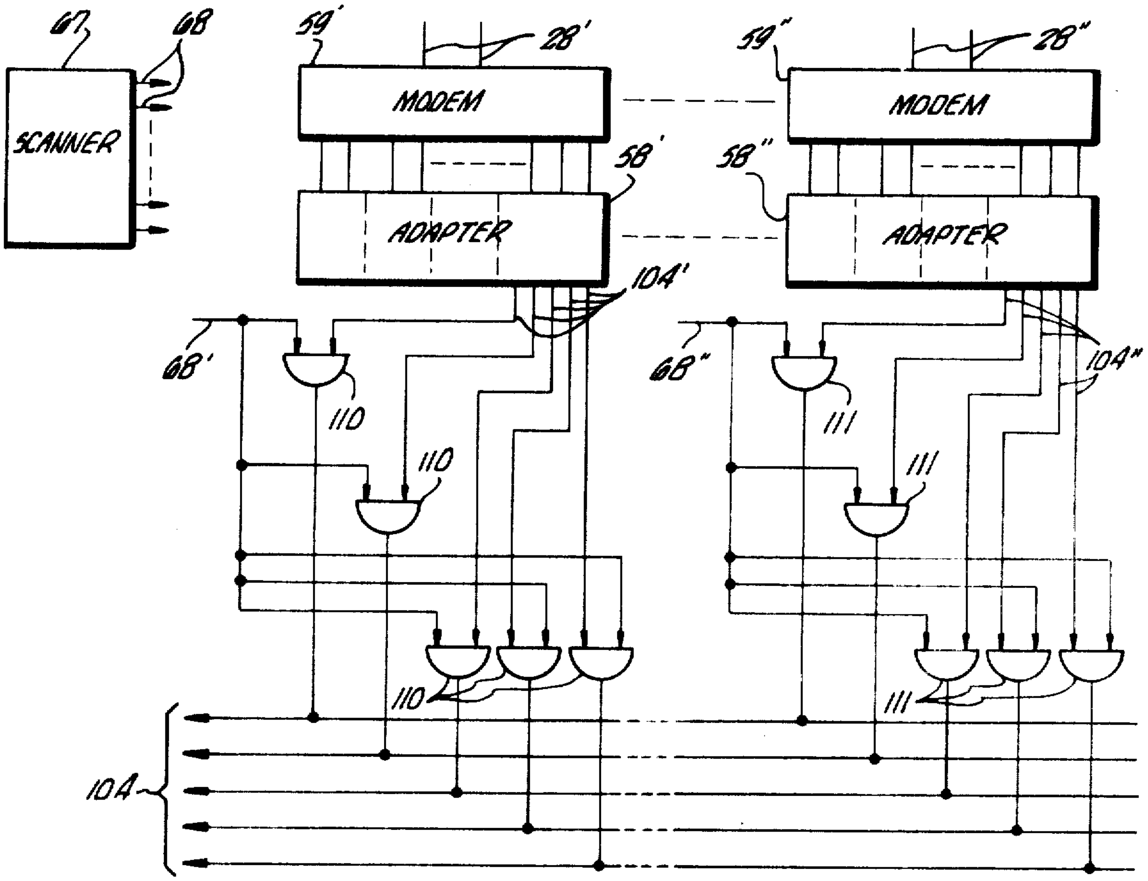
FIG. 5 depicts in greater detail the adapter identification bus shown in FIG. 4.

FIG. 5 depicts in greater detail the means by which information concerning a selected adapter is applied to to the adapter information bus 104. FIG. 5 depicts two illustrative ones of the line adapters 58 designated 58′ and 58″. It also depicts two illustrative ones of the modems 59 designated 59′ and 59″. Modems 59′ and 59″ are connected to particular ones of the input-output units 61, not shown, via transmission lines 28′ and 28″, respectively. Scanner 67 determines which of the line adapters 58 is connected to adapter information bus 104 at any given time. It does this by means of signals presented on its thirty-six output lines 68. Thus, when a signal is presented on the particular one of the output lines designated 68′, the adapter information lines 104′ of line adapter 58′ are connected to adapter information bus 104 by gates 110. Similarly, when scanner 67 presents a signal on its output line 68″, the adapter information lines 104″ of adapter 58″ are connected to adapter information bus 104 via gates 111. The scanner 67 thus sequentially connects the thirty-six line adapters 58 to the adapter information bus 104. If, for example, the adapter information bus 104 comprises five lines, it may assume a total of thirty-two unique combinations. The information lines from each adapter present an unchanged combination of signals which are used to identify the particular type of terminal unit associated with a particular adapter. Thus, for example, if the five information lines of a particular one of the line adapters 58 are fixed such that their logical states are true, false, false, true, false, then the decimal equivalent binary state of these five lines would be the number eighteen. This number eighteen may be used to identify the type of terminal unit associated with this particular line adapter. This identification does not denote the particular position of the line adapter but, rather, identifies the type of terminal unit, and/or the type of transmission mode, and/or the type of line control, and/or the type of error control associated with its terminal unit. Several of the adapters 58 may have the same identity number. Thus, for example, if there are three TWX services as terminal units for the system, the three line adapters associated with the services will have the same identity.

Figure 6:
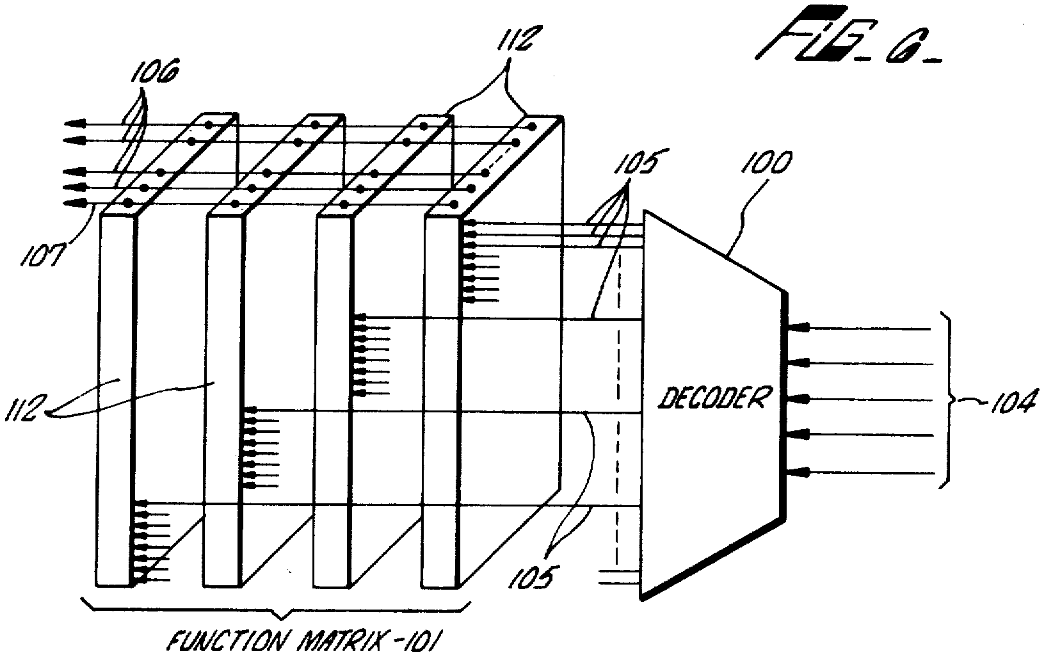
FIG. 6 depicts in greater detail the parameter function matrix shown in FIG. 4.

As the scanner sequentially points to the various ones of the line adapters, the adapter identification bus 104 assumes the identity of the particular line adapter to which the scanner 67 is pointing. The five lines of adapter identification bus 104 provide the input to decoder unit 100 depicted in FIG. 6. Decoder 100 may, for example, be a five by thirty-two decoder unit which has thirty-two output lines 105, only one of which will be energized as a result of each of the thirty-two possible combinations of signals appearing on the five lines 104. The output lines 105 of decoder 100 are connected to function matrix 101 which is made up of a number of removable cards containing integrated circuitry thereon. As shown in FIG. 6, the function matrix 101 may, for example, comprise four such cards with each card having a unique eight lines of the thirty-two output lines 105 from decoder 100 connected thereon. Each of the cards 112 of function matrix 101 has a number of function control lines 106 and a number of control code select lines 107 connected thereto. The function matrix 101 is an integrated circuit gate matrix but works logically like the well-known diode matrix. The output lines 106 are function lines which control various functions of the multi-line control unit 23. Each of the thirty-two input lines 105 will cause a particular combination of the output lines 106 and 107 to be energized. Thus, with a particular identity on the adapter identification bus 104, a particular input line 105 to matrix 101 has a signal presented thereon, and as a result of the signal appearing on this input line, signals appear on a particular combination of the output lines 106 and 107.

The output lines 106 are connected to control circuitry 71, as shown in FIG. 4, and control various functions within the input-output control unit 23. Signals on these output lines 106 essentially indicate the characteristics of the particular line adapter 58 at which scanner 67 is pointing at any given time. Among the control functions which may be handled as a result of signals appearing on output lines 106 may be the following:

(a) Determining whether the most significant bit is the first bit transmitted or whether the least significant bit is the first bit transmitted;
(b) Determining the number of bits per character;
(c) Indicating whether vertical parity is used;
(d) Indicating whether horizontal parity is used;
(e) Determining whether parity used is even or odd;
(f) Determining the number of stop bits which are utilized;
(g) Determining whether transmission is synchronous or asynchronous;
(h) Determining whether a dial line or leased line is utilized; and
(i) Determining whether a start of message code is utilized.

When the scanner 67 points at a particular line adapter, the function matrix 101 thus enables the entire multi-line control unit 23 to behave in a proper manner to control transmission of data between the control unit 23 and the input-output unit 61 associated with the particular line adapter. The matrix 101 thus enables any type of terminal unit which a customer may desire to be accommodated by the system of the present invention without manually changing any wiring within the control unit. Thus, the present invention achieves the advantages of both modularity and chanegability. When a user desires to add a new type of terminal unit to his system, all that need be done is either that one of the cards 112 be pulled out of the function matrix 101 and the necessary changes made on that card or that a new card simply be added to function matrix 101. Each group of eight input lines 105 to the function matrix 101 is connected to a separate card 112 within the function matrix. If fewer than all four cards are needed at any given time, a new type of terminal unit may be accommodated simply by adding an additional card to the function matrix 101.

If, for example, a user is utilizing only five different kinds of input-output units 61 and he wants to add an additional type of terminal unit, he will have been using only one card 112 in the function matrix 101 prior to his decision to add a new type terminal unit 61. As a result, the single card 112 which he has been utilizing could be pulled out and diodes added to that card at the proper crosspoint positions or, alternatively, the user could simply obtain a new card which could be inserted in one of the unusued card positions of matrix 101. The use of such a function matrix made up of removable cards has the significant advantage of ease of changeability. As a result, it is only necessary to change or add an etched card within the matrix whenever a new type terminal unit must be accommodated, rather than requiring a wiring change to be made within the machine itself. The cards which are utilized contain integrated circuits having chips in the desired locations. By simply changing these cards, a saving of time is achieved, a saving of expense is achieved and considerable inconvenience is avoided.

Figure 7:
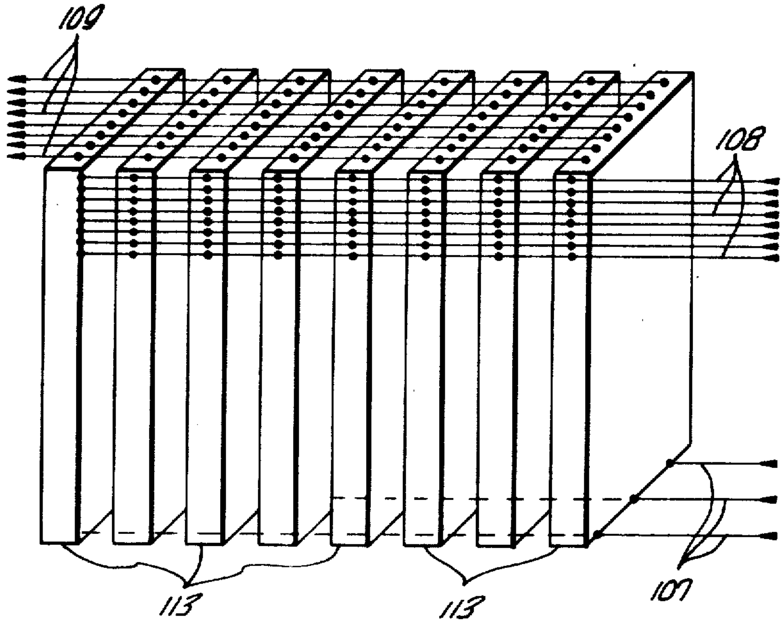
FIG. 7 depicts in greater detail the control code cards shown in FIG. 4.

The output lines 107 of function matrix 101 are utilized as inputs to control code matrix 102. Control code matrix 102 depicted in FIG. 7 may comprise a number of removable etched cards 113. For purposes of illustration, FIG. 7 depicts three input lines 107 and eight control code cards 113. The control code cards 113 are similar in structure to the function matrix cards 112. Eight combinations of binary signals can be applied to the three input lines 107. Any one of the thirty-two outputs of decoder 100 can call forth any one of these eight combinations on the control code select lines 107. These three lines 107 are utilized to form a bus which goes to all eight of the control code cards 113. Each of the eight combinations of signals on the control code select lines 107 serves to select one of the control code cards 113.

These control code cards are utilized to recognize control code characters as they are transmitted and, in response to such recognition, to provide signals on function lines 109 connected to all of the control code cards 113. The recognition is made by means of a comparison between a set of control code characters contained on each of the cards 113 and the character being transmitted. The character being transmitted between the control unit 23 and a particular one of the input-output units 61 is presented to the cards 113 from register 78 by lines 108. The control code cards thus sense the stream of information being transmitted and indicate when a control code character is present. These control code characters are a function of the code format which a user selects and are not necessarily dependent upon a particular type of input-output unit. Selection of a given one of the control code cards 113 thus indicates the particular control code format which is being used and the subsequent comparison of a character being transmitted with a set of characters on the selected card indicates whether the character being transmitted is a control code character. The eight control code cards 113 have associated therewith a number of output lines 109 which manifest a fixed set of control code functions. Thus, for example, if eight such lines 109 are utilized, they might indicate the following eight functions:

(a) Start of text function;
(b) End of text function;
(c) End of transmission function;
(d) Response function;
(e) Inquiry function;
(f) Synchronous function;
(g) Special character function; and
(h) Miscellaneous function.

Every control code character on any one of the cards 113 must call forth one of the preceding functions manifested by signals on lines 109. It is possible, however, to have several different control code characters on the same card specify the same function. Thus, for example, it would be possible for several different control code characters on a card to specify the end of text function.

A comparison occurs in matrix 102 whenever all of the bits of a character are stored in the scratchpad register 78. If, for example, there are eight bits in a full character, then the selected one of the control code cards 113 will receive the eight bit character stored in register 78 over input lines 108 when a comparison is to be made. If there is a match between the received character and any of the control code characters defined on the selected card, then the output functions which that code character calls for are manifested by the presentation of signals on appropriate ones of the output function lines 109. Use of removable cards for the control code matrix 102 enables a new terminal unit which utilizes a new control code format to be easily accommodated by the system. This accommodation is made simply by adding a new control code card which contains the new set of control codes to the matrix 102.

Thus, as a result of the present invention, any change to the system which is required by a user as a result of his adding a new type of terminal unit to the system can be achieved merely by changing a card or adding a card with respect to two sets of such cards, namely, the function matrix cards and the control code character cards.

All of the circuits shown in the accompanying drawing in block diagram form are of a type well known to persons skilled in the art. All of the circuits designated as control circuits, for example, comprise well known logic circuitry which may easily be designed to perform the functions specified for these circuits.

What has been described is considered to be only an illustrative embodiment of the present invention and, accordingly, it is to be understood that various and numerous other arrangements may be devised by one skilled in the art without departing from the spirit and scope of this invention.

What is claimed is:

1. In a data communication system in which a plurality of different types of remote terminal units transmit and receive electrically coded characters over a plurality of transmission lines to a multi-line control unit, the multi-line control unit comprising a buffer register, a plurality of line adapters, there being one line adapter for each transmission line, each line adapter providing a binary coded output identifying the particular type of remote terminal unit connected with the associate transmission line, means for controlling the transfer of information between the register and each of the adapters, function matrix means having a plurality of output lines connected to the control means, means for connecting the type identifying coded output of any selected one of the adapters to the function matrix means, the function matrix means providing a predetermined output pattern of signals on the output lines for each pattern of signals on the input lines, control code matrix means having a plurality of output lines connected to the control means, means for connecting the output of the register to the control code matrix, the control code matrix including a plurality of individual circuits each coupled to the output of the register, each circuit having a plurality of outputs which are selectively energized by the pattern of signals on the input, and means responsive to the pattern of signals on the input to the function matrix means for selectively activating particular ones of said circuits in the control code matrix.

2. Apparatus as defined in claim 1 wherein the control means further includes scanning means for sequentially coupling type identifying outputs of each of the adapters to the function matrix.

3. Apparatus as defined in claim 1 wherein each of said circuits in the control code matrix is mounted on a single replaceable circuit card.

References Cited

UNITED STATES PATENTS

| | | | |
|---|---|---|---|
| 3,147,404 | 9/1964 | Sinner | 317—101 |
| 3,210,773 | 10/1965 | Terzian et al. | 340—172.5 |
| 3,225,334 | 12/1965 | Fields et al. | 340—172.5 |
| 3,248,709 | 4/1966 | Betz | 340—172.5 |
| 3,274,561 | 9/1966 | Hallman et al. | 340—172.5 |
| 3,297,996 | 1/1967 | Grady | 340—172.5 |
| 3,308,442 | 3/1967 | Couleur et al. | 340—172.5 |
| 3,411,141 | 11/1968 | Bernier et al. | 340—172.5 |
| 3,416,139 | 12/1968 | Marx | 340—172.5 |

PAUL J. HENON, Primary Examiner

P. R. WOODS, Assistant Examiner

PO-1050
(5/69)

UNITED STATES PATENT OFFICE
CERTIFICATE OF CORRECTION

Patent No. 3,514,758 Dated May 12, 1970

Inventor(s) James Russell Bennett

It is certified that error appears in the above-identified patent and that said Letters Patent are hereby corrected as shown below:

Column 1, Line 44- For "may" substitute "many";
Column 2, Line 18- For "controls" substitute "control";
Line 62- For "is enables" substitute "it enables";
Column 4, Line 52- For "reversed" substitute "reserved" and for "simple" substitute "single";

Column 6, Line 9 - For "controlled" substitute "generated";
Column 11, Line 58- Insert "time" after the word "this".

SIGNED AND SEALED
NOV 10 1970

(SEAL)
Attest:

Edward M. Fletcher, Jr.
Attesting Officer

WILLIAM E. SCHUYLER, JR.
Commissioner of Patents